US012036584B2

(12) United States Patent
Zachariah et al.

(10) Patent No.: US 12,036,584 B2
(45) Date of Patent: Jul. 16, 2024

(54) METHOD TO REMOVE EXPLOSIVE AND TOXIC GASES AND CLEAN METAL SURFACES IN HYDROCARBON EQUIPMENT

(71) Applicants: Ashley Zachariah, Niagara Falls (CA); Richard M. Kelly, East Amherst, NY (US); Michael St. James, Calgary (CA); Joseph E. Gulayets, Edmonton (CA)

(72) Inventors: Ashley Zachariah, Niagara Falls (CA); Richard M. Kelly, East Amherst, NY (US); Michael St. James, Calgary (CA); Joseph E. Gulayets, Edmonton (CA)

(73) Assignee: PRAXAIR TECHNOLOGY, INC., Danbury, CT (US)

(*) Notice: Subject to any disclaimer, the term of this patent is extended or adjusted under 35 U.S.C. 154(b) by 237 days.

(21) Appl. No.: 16/951,444

(22) Filed: Nov. 18, 2020

(65) Prior Publication Data

US 2021/0340469 A1 Nov. 4, 2021

Related U.S. Application Data

(60) Provisional application No. 63/018,131, filed on Apr. 30, 2020.

(51) Int. Cl.

| | |
|---|---|
| ***B08B 3/00*** | (2006.01) |
| ***B08B 3/08*** | (2006.01) |
| ***C11D 3/00*** | (2006.01) |
| ***C11D 3/18*** | (2006.01) |
| ***C11D 3/20*** | (2006.01) |
| ***C11D 3/30*** | (2006.01) |

(52) U.S. Cl.
CPC ................ *B08B 3/003* (2013.01); *B08B 3/08* (2013.01); *C11D 3/0094* (2013.01); *C11D 3/185* (2013.01); *C11D 3/2093* (2013.01); *C11D 3/30* (2013.01); *C11D 2111/20* (2024.01)

(58) Field of Classification Search
None
See application file for complete search history.

(56) References Cited

U.S. PATENT DOCUMENTS

| | | | | |
|---|---|---|---|---|
| 3,084,076 | A * | 4/1963 | Loucks | F28G 9/00 134/36 |
| 5,356,482 | A | 10/1994 | Mehta et al. | |
| 5,421,903 | A | 6/1995 | Manabe et al. | |
| 6,936,112 | B2 | 8/2005 | Jansen et al. | |
| 9,017,488 | B2 | 4/2015 | Nath et al. | |
| 2005/0183744 | A1 | 8/2005 | Staub et al. | |
| 2018/0208876 | A1* | 7/2018 | Man | C11D 3/2068 |

FOREIGN PATENT DOCUMENTS

| | | | |
|---|---|---|---|
| CA | 2118089 | A1 | 4/1995 |
| CN | 87104321 | A | 3/1988 |
| EP | 02450162 | A2 | 12/1987 |
| GB | 2451170 | A | 1/2009 |
| WO | 2016/067121 | A1 | 5/2016 |

* cited by examiner

*Primary Examiner* — Eric W Golightly
*Assistant Examiner* — Arlyn I Rivera-Cordero
(74) *Attorney, Agent, or Firm* — Iurie A. Schwartz

(57) ABSTRACT

The present invention relates to a method of rapidly decontaminating hydrocarbon contaminated equipment by sequencing a cleaning mist or foam, an encapsulating mist or foam and a dry carrier gas.

16 Claims, 2 Drawing Sheets

*Example of equipment layout in current treatment process*

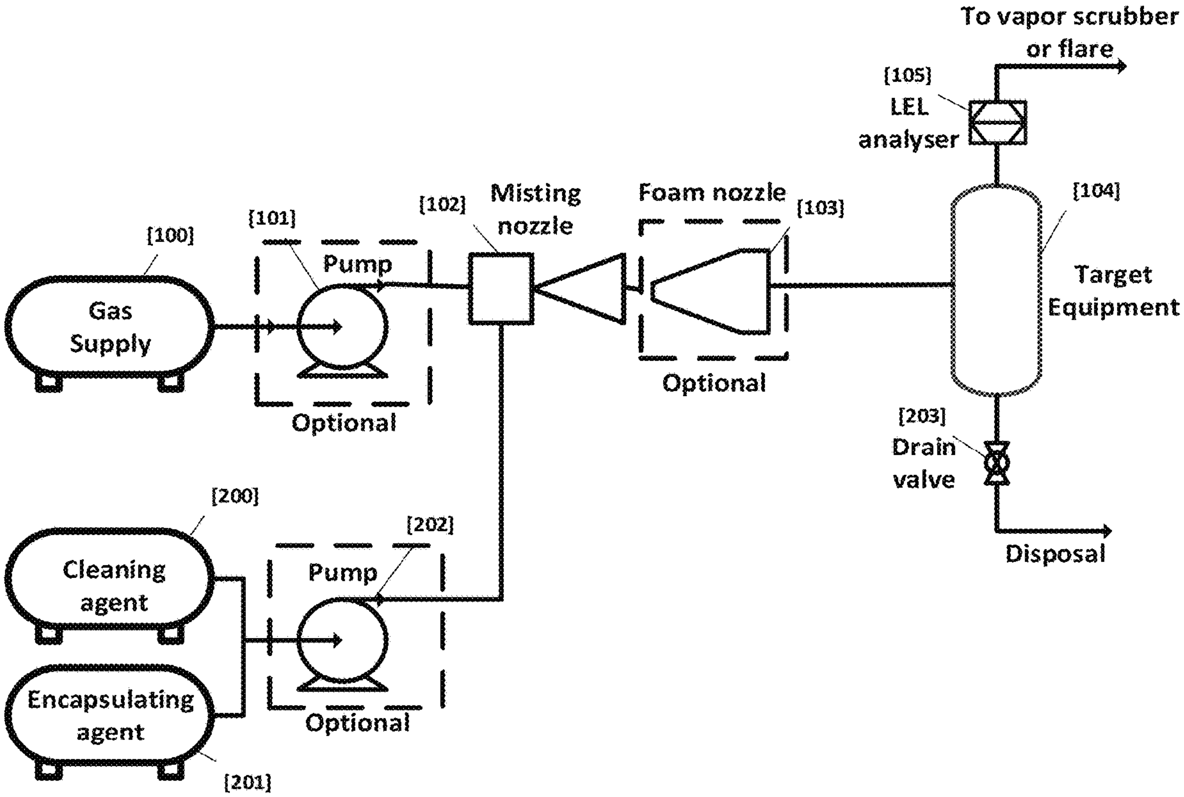
*Figure 1: Example of equipment layout in current treatment process*

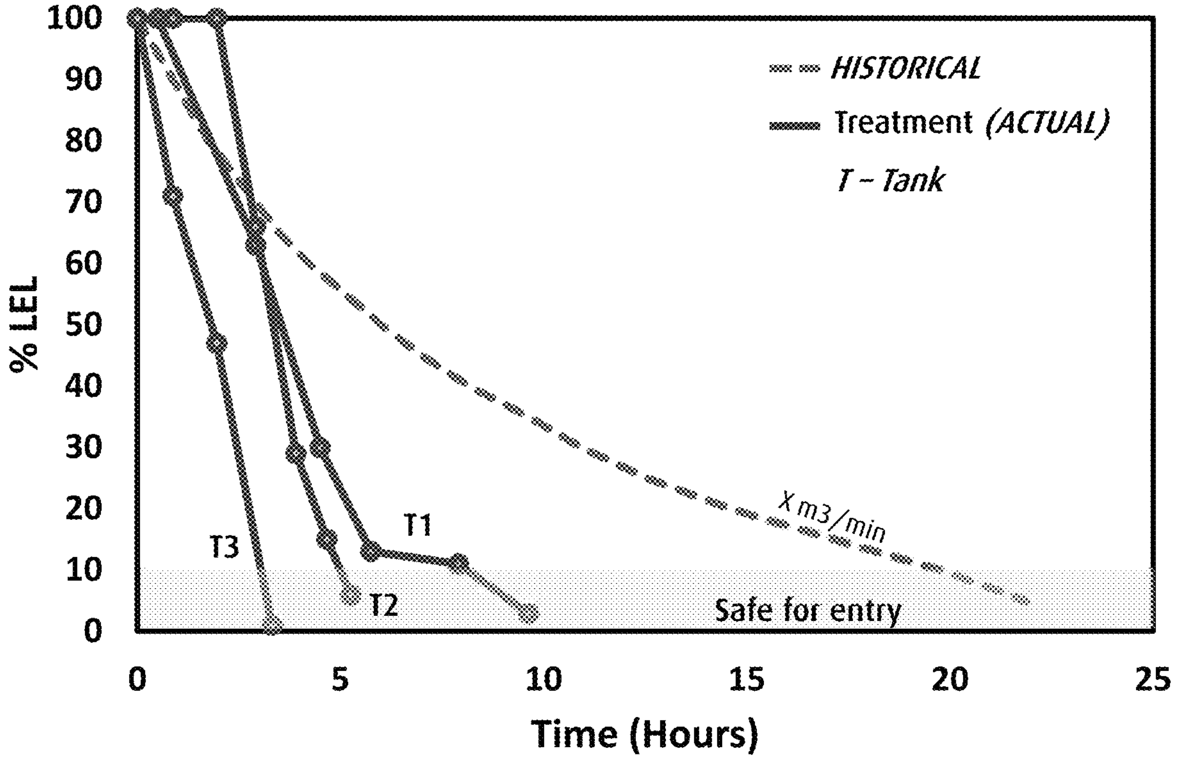
*Figure 2: Comparison of Nitrogen only purging versus new treatment method*

METHOD TO REMOVE EXPLOSIVE AND TOXIC GASES AND CLEAN METAL SURFACES IN HYDROCARBON EQUIPMENT

RELATED APPLICATIONS

This application claims the benefit of U.S. Provisional Application Ser. No. 63/018,131, filed on Apr. 30, 2020, which is incorporated herein by reference.

FIELD OF INVENTION

The present invention relates to a method of rapidly decontaminating and making safe for entry, hydrocarbon contaminated equipment by sequencing a cleaning mist or foam, an encapsulating mist or foam and a dry carrier gas. This enables a significant (e.g., greater than 50%) time reduction for decontamination compared to alternate methods. Target process equipment includes but is not limited to oil storage vessels, piping conduits, process vessels, heat exchangers, distillation columns, compressors, connectors, rotating equipment and pumping stations wherein the storage and processing of crude oil and its derivatives results in progressive contamination of metal surfaces of equipment and presence of toxic vapors that are a health threat to site personnel. Equipment must undergo scheduled maintenance in refineries and producing sites (called turnarounds) for optimal operation and the present method provides a safer and quicker alternative for decontamination, personnel entry and maintenance at predetermined time intervals

BACKGROUND OF THE INVENTION

For various reasons, equipment utilized in petroleum and hydrocarbon processing industries requires routine, periodic inspection and maintenance. Reasons include degradation of equipment due to age, fouling or corrosion, preventative maintenance of critical parts and valving or periodic mandatory inspection required by state, provincial or federal regulations. This maintenance may be planned or unplanned. Oil producing and processing facilities like steam assisted gravity drainage (SAGD) facilities and refineries undergo planned maintenance events called turnarounds. This is to ensure preventative maintenance on equipment (replacement of roofs on storage tanks or de-fouling of heat exchangers for example). The primary reason is to continue operating plants at the maximum process efficiency possible. Turnarounds may last a few days to a few months depending on the scope and size of the facility. They require an extensive amount of planning and scheduling of labor, services and materials. Often, a turnaround can cause parts of the plant or the entire facility to shut down. This partial or complete shutdown involves temporary reduction in production and significant associated cost impact and potential loss in revenue. It is, therefore, critical to reduce as much as possible, the total time taken to complete the turnaround and stick to scope and schedule while performing the turnaround operation safely.

A large portion of the scope of turnaround work involves preparation of equipment for maintenance. A consequence of processing of hydrocarbon fractions is the guaranteed presence of flammable or explosive gases and leftover residues inside equipment. These explosive gases are commonly referred to as "LELs" (LEL standing for Lower Explosive Limit) in industry. LEL is defined as the minimum concentration of a gas or vapor in air that could cause combustion in the presence of an ignition source. Some gases are also toxic at very minimal concentrations (e.g., $H_2S$) and needs removal to other safe limits. An atmosphere that poses an immediate threat to life or could result in immediate or acute health effects is termed as immediately dangerous to life or health (IDLH) compounds. Before any work can be done, the levels in the equipment must be brought down to acceptable limits. The goal for the entire operation to be rendered safe for work is <10% LEL (OSHA part 1915 Subpart B). The objective is to remove the problem gases inside this equipment so personnel can safely enter and perform required scope of work. Depending on the size of the unit, current practices and technologies can take days or weeks to make equipment safe to work.

Storage vessels and heat exchangers are two good examples of equipment susceptible to elevated presence of toxic hydrocarbon vapors, sludge content and coating of residues on metal surfaces like tubes and baffles. There are a few methods in which these pieces of equipment are made safe for entry today:

1) Atmospheric venting to remove toxic gases
2) Nitrogen purging to remove toxic gases
3) Decontamination:
    a. Sludge clearing in Tanks
    b. Chemical Cleaning
        i. Liquid recirculation
        ii. Vapor phase cleaning Atmospheric Venting: Venting to atmosphere is a method to LEL free smaller equipment. This method is used in very niche circumstances and depends on the size and geographical location of the equipment. Some equipment (e.g., small pumps, low pressure storage tanks) may be left open to atmosphere to vent hydrocarbon vapors especially if the facility is not located near a city where odor problems may be of concern. The time taken to reduce the LEL's to <10% could be day or weeks. Depending on the region and emissions levels, environmental regulations may require hydrocarbon monitoring and reporting of the facilities total carbon footprint. This is especially of concern in Canada where carbon emissions are priced per ton, and which is poised to increase every year. This renders atmospheric venting ineffective and cost prohibitive not to mention, very environmentally unfriendly. Furthermore, if the equipment is in the critical path during a turnaround, atmospheric venting might be more expensive that other options accounting for time value of money. Another disadvantage is that by atmospheric venting, there is no cleaning of any metal surfaces, only removal of LELs or toxic hydrocarbon gases. Therefore, there needs to be additional cleaning performed on the equipment.

Nitrogen Purging: Nitrogen is used in many industries to prevent fires, explosions and degradation of products by blanketing, inerting and purging. This is the most widely used method to remove toxic gases from equipment. In equipment where the maximum allowable working pressure is minimal to none, a continuous flow of nitrogen is injected into the contaminated process equipment while the same flowrate of gas is vented out the other end. This allows for reduction in the concentration of toxic gases by dilution and removal with nitrogen. Nitrogen and toxic gases being displaced from the vessel are sent to flare or vented to the atmosphere. Once safe levels are reached, air blowers may be used to remove the inert gas and prepare for safe entry. Where vessels may operate at higher pressure, a pressure purge might be used to inert equipment. This involves pressurizing equipment with nitrogen gas followed by a depressurization step and commonly referred to as a "huff and puff". By pressurizing the system/contaminated equipment, the advantage is ensuring that dead legs or volumes where the gas would otherwise not make it through, are filled with nitrogen. When the nitrogen and LEL is sent to flare, Flare Gas Recovery Unit (FGRU) constraints need to be part of the purging calculations and turnaround preparation. Given nitrogen dilutes energy content, at times the FGRU becomes the limiting factor and increases time to complete LEL freeing of equipment.

In the heavy oil industry in Canada, process equipment can contain 3-5 feet of sludge in tanks which causes complications with purging. The sludge is kept warm to prevent the bitumen from solidifying and causing transport issues. Sludge has a high heat capacity, contains a significant concentration of trapped combustible gases/LELs/toxics and continues to emit these after purging with nitrogen has been completed successfully. This makes estimating the total nitrogen required to LEL free a vessel difficult and causes safety issues since the atmosphere might not be inert a time period later. The current invention overcomes the limitations of nitrogen purging as it relates to sludge degassing, unpredictability, total nitrogen use and time to successfully inert equipment.

Decontamination: This is broadly defined as the removal of vapor, liquid and solid contaminants that tend to coat metal surfaces. Handling and processing of petroleum and petrochemical products almost always results in metallic surfaces coated with residue. Chemical cleaning is a technique where solvents or chemicals are injected into the process equipment in a liquid or vapor form to achieve higher cleaning efficiencies by solubilization or mobilization of these residues. Temperature and pressure may also be used to enhance cleaning efficiency.

Canadian Patent No. CA 2,118,089 discloses a thermo-chemical method for cleaning storage tanks wherein a combined action of an organic solvent, and an in-situ nitrogen generation system results in fluidizing the sludge by agitation for procurement and secondary treatment. The nitrogen generation system includes a reducing nitrogen salt, an oxidizing nitrogen salt and an acid activator which interact to generate nitrogen and heat thereby causing thorough mixing of the sludge. This patent document does not contemplate toxic gas removal or the use of nitrogen gas or the decontamination of metallic surfaces using a mist or foam.

U.S. Pat. No. 5,421,903 describes a multi vehicle system for washing a tank, recovering and treating tank residues by solubilization and dissolution with a jet of water or oil suctioned from the tank. This is followed by washing with hot or cold water. Inert gas may be injected during the residue recovering operation. The aim of the disclosed process is washing an oil tank with water and recovering the heavy residues inside a tank. The method does not specify the removal of toxic gases or the use of solvents and encapsulating agents to prevent sludge degassing.

Chemical cleaning is also used to achieve cleaning objectives where fouling is high and involves extensive foulant buildup. This is a significant problem especially in heat exchangers, since petroleum products tend to deposit on metal surfaces causing heat exchange coefficient decay, reduced heat transfer area and significant cost impact.

U.S. Pat. No. 6,936,112 B2 describes a process to clean metal surfaces of heat exchangers that are contaminated by organic residues in petroleum industries. The process involves vaporization of a terpene and surfactant in steam at high temperatures so that the hydrocarbon contaminants are vaporized and removed from the system. The patent does not anticipate the need for removal of noxious gases from equipment, only cleaning of the metal surfaces. The current invention overcomes limitations present with the use of steam like safety issues, scaling and corrosion and steam availability. Also, high temperatures are not needed for the present invention to prove highly effective.

U.S. Pat. No. 9,017,488 B2 contemplates a process to remove noxious gases from media packed equipment like fixed bed catalytic reactor systems and adsorbent beds. It involves vaporizing a solvent in a carrier gas at high temperatures (350-450° F.) that is free of water, for example hydrogen and nitrogen, to form a cleaning vapor. This cleaning vapor solubilizes and removes noxious gases in the reactor. The present invention, on the other hand, does not vaporize the cleaning or encapsulating agent. The cleaning and encapsulating chemistry is delivered as a liquid mist or foam in nitrogen gas. Additionally, the present invention can enable decontamination of equipment within a 12-hour shift versus days.

U.S. Pat. No. 5,356,482 discloses a method wherein terpenes are used as a solvent to remove LELs from equipment. The process involves condensed liquid circulation in the equipment, and injection of the chemistry into the water circulation in the vessel. The method disclosed in this document is typically performed at high pressure, which is not the case in the present invention. Unlike the process disclosed in this document, the present invention does not require filling the target equipment and recirculation of chemistry to remove LELs. Recirculation methods involve a significant amount of chemical waste along with expensive disposal issues. The present invention uses a highly effective mist or foam that neutralize $H_2S$ and remove all the noxious gases from the equipment rapidly with minimal chemical use.

SUMMARY OF THE INVENTION

The present invention is a novel method of rapidly cleaning and making safe for personnel entry, contaminated equipment in hydrocarbon storage, handling and processing facilities. This comprises sequencing a mist or foam of cleaning chemicals (e.g., terpenes, distillates, naphtha, heavy reformate), encapsulating chemicals (e.g., amines or methyl esters pyrimidine, mono ethanol amine (MEA), triazene with a cleaning and/or foaming surfactant/non-ionic surfactant) and a carrier gas, wherein the carrier gas is non aqueous and preferably nitrogen. This novel method is a significantly faster and safer alternative decontaminate process equipment and includes the following exemplary embodiments:

i) In an exemplary embodiment, sequencing encapsulating chemicals in nitrogen delivered as a mist and optionally followed by nitrogen purging only until LELs drop to acceptable limits (including toxic limits);
ii) In another exemplary embodiment, sequencing encapsulating chemicals in nitrogen delivered as a foam and optionally followed by nitrogen purging only until LELs drop to acceptable limits;
iii) In yet another alternate embodiment, sequencing cleaning chemicals in nitrogen as a mist and optionally followed by nitrogen only at elevated temperature until metallic surfaces are clean;
iv) In a preferred embodiment, the method of sequencing the delivery of cleaning chemicals in nitrogen as a mist, delivery of encapsulating chemicals as a mist and nitrogen purging only until LELs drop to acceptable limits.

v) In another preferred embodiment, the method of sequencing the delivery of cleaning chemicals in nitrogen as a mist/foam, delivery of encapsulating chemicals as a mist/foam and optionally followed by nitrogen purging only until LELs drop to acceptable limits. Optionally the cleaning and encapsulating steps can be done simultaneously.

Other embodiments are also possible, as would be appreciated by this skilled in the art, and included within the scope of the invention.

BRIEF DESCRIPTION OF THE FIGURES

The objects and advantages of the invention is better understood from the detailed description with the following accompanying tables and figures:

FIG. 1 illustrates the typical layout of the equipment; and

FIG. 2 illustrates commercial application of the invention in heavy oil storage tanks.

DETAILED DESCRIPTION OF THE INVENTION

The present invention describes a method for rapidly decontaminating equipment or series of equipment in hydrocarbon processing industries, providing producers and refiners significant time savings. For the purposes of this invention, decontamination is defined as removal of oil and organic residues deposited on metal surfaces of equipment including any hydrocarbon that registers an LEL reading on an LEL detector. Types of compounds that register an LEL reading are typically light hydrocarbons e.g. $C_1$-$C_8$, preferably $C_8$-$C_{40}$. Given this enhanced time savings, producers not only reduce cost on additional cleaning steps required but are able to reach environmental and safety limits faster for atmospheric venting and personnel entry and alleviate FGRU capacity constraints. Additionally, this method also provides the benefit of reducing the probability of post-purge LEL spikes, a common safety issue seen in the heavy oil industry. This is a result of the requirement to keep sludge warm for transport and sludge's ability to off gas LELs.

The process involves sequencing the injection of a cleaning agent, an encapsulating or absorbing agent and a dry carrier gas (e.g., nitrogen) as described herein. The equipment footprint comprises of a series of fittings, hoses, a high shear mixer and high expansion foaming system. Prior to injection, the target equipment must be prepared for decontamination. This preparation involves ensuring that the target equipment is drained, injection or tie-in points are above any heavy residues or sludge levels, and vent streams are appropriately routed or treated (example scrubbed with a vapor scrubber or routed to the flare gas recovery unit). The method does not require operation at pressure, in fact the current treatment has proven very effective in storage tanks with a maximum allowable working pressure (MAWP) of 0.5 psig.

Once the desired equipment has been made ready for decontamination, a cleaning agent with a high solubility index and optionally, high aromatic content is suctioned or pumped at a controlled rate from the cleaning agent source [200]. Nitrogen [100] is heated and an accurate volumetric or mass flowrate and delivered to the high shear mixer (i.e., misting nozzle) [102] where the gas mixes with the cleaning agent to form a highly effective cleaning mist of cleaning agent liquid in nitrogen gas. The misting nozzle can be of different types spray heads, laval nozzle, an eductor or a t-fitting. In an exemplary embodiment, an eductor is used as the high shear misting nozzle. The misting nozzle is optionally coupled with a high expansion foaming nozzle [103] before entering the target equipment [104]. The foam nozzle [103] is designed to expand the foaming solution into bubbles of nitrogen in liquid chemical. This is achieved by delivering the mist of the foaming solution form the high shear mixer onto a stainless-steel screen and forcing the motive dry gas constantly through the screen. This continuous flow of both foaming solution and dry gas through the screen generates a large volume of foam. Based on the design parameters of the process equipment (e.g. size, vent stream processing, baffles, riser spouts, aeration nozzles, mixing nozzles etc.) the method of application (mist or a foam) is chosen. This mist or foam of the cleaning chemical is delivered to the entire volumetric space of the target equipment. When delivered as a mist, the liquid droplets traverse through the volumetric totality of the equipment like a fog. In a preferred embodiment, the misting nozzle is directly connected to the process equipment.

The nitrogen source [100] could be a nitrogen pumper, onsite pressure swing adsorption (PSA) system, onsite nitrogen storage with a vaporizer, or high-pressure nitrogen source (e.g., series of packs of cylinders or a tube trailer). The flowrate of carrier gas depends on the size and volume of the target equipment and can range from 10 scfm (~0.3 m3/min) to 10,000 scfm (~280 $m^3$/min), and preferably in the range of 20-7300 scfm. In a preferred embodiment the nitrogen purity is 99.999% or greater. The liquid concentration during delivery is in the range of 0.01-0.2% on a volumetric basis to the carrier gas and preferably in the 0.03-0.1% range. $CO_2$ or light hydrocarbon gases like methane, fuel gas, natural gas, ethane, propane and butane or a combination could be used as a carrier gas, although not inert.

When the cleaning agent enters the process equipment, it solubilizes or mobilizes any heavy organic residues stuck to metal surfaces. The typical volume of cleaning chemical injected is dependent on the estimated amount of contaminant in the equipment to be cleaned and the total metallic surface area that needs coverage. The cleaning agent may be applied at ambient temperature (70° F.) but is preferentially applied at higher temperatures, specifically 90-250° F. After injection of cleaning chemistry, it is preferred that drain points are opened to drain all dislodged organic material.

After the injection of the cleaning chemistry, an encapsulating (or absorbing) agent is delivered from the encapsulating agent source [201]. The encapsulation agent is suctioned or pumped [202] to the high shear mixer [102] where it mixes with the carrier gas and is delivered as a mist or foam into the target equipment. A mist allows for rapid dispersion of encapsulating chemical to all parts of the equipment. A foam on the other hand allows for good contact with all parts of the surfaces. The purpose of the encapsulating agent is two-fold: i) to neutralize the hydrogen sulfide ($H_2S$) present and ii) cap the generation of noxious gases from the sludge. As the encapsulating mist settles, it forms a skim layer over hydrocarbon residues or sludge. This skim layer prevents any further off-gassing which might otherwise result in a post purge LEL spike.

One of the active agents in the encapsulating agent is the surfactant. Typically, surfactants have a hydrophobic tail and hydrophilic head. The hydrophilic head is electrically charged. Based on the charge, surfactants are broadly classified anionic, nonionic, cationic or amphoteric. Anionic surfactants have a negative charge and are foaming surfactants. They are used in frequently in soaps and detergents but create a lot of foam when mixed with gas. Nonionic surfactants on the other hand are neutral and do not have any charge on the hydrophilic end. Nonionic surfactants are typically very good at removing oils. They are low foaming or non-foaming and are typically used for cleaning purposes and used in conjunction with anionic surfactants. In a preferred embodiment, the encapsulation agent consists of amine compounds, a foaming and a cleaning surfactant. In another preferred embodiment, the expansion ratios of foam are in the range of 200-1000. The pressure drop (ΔP) across the high shear mixer is monitored and can affect the particle size of mist delivered. It is preferred that the ΔP is in 60-150 psig range. This allows for generation of fine mist or fog, enables good gas lift and dispersion throughout the volume of the tank. In the case where a foam is used as a method of application, it is preferred that the equipment is foam filled from the bottom up. This is to ensure that the total displacement of explosive gases is directed towards the vent hatch preventing any channeling or bypassing of LEL pockets.

After injection of the encapsulating agent, the vessel is treated with a sequence of treatment steps of carrier gas only and encapsulating agent mist/foam. This sequencing results in a dramatic reduction in time required to bring the noxious gas levels to acceptable limits. After the first hour of injection, vent or recycle stream gas sampling are done periodically until the equipment reaches target LEL limits.

The invention is further explained through the following examples, based on various embodiments of the invention, which are not to be construed as limiting the present invention.

Comparative Example 1

An example and resulting impact of such a treatment is shown in FIG. 1. Three tanks (T1, T2, T3) 1-million-gallon capacity skim tanks (approximately 60 ft in diameter and 50 ft in height) were scheduled for roof repairs and internal inspection at a steam assisted gravity drainage (SAGD) heavy oil site in northern Alberta, Canada. All three skim tanks had internals present. Also, the sludge content in the tanks was about 4 feet high and at 120° F. From prior operational data and backed by a purge model, the time taken to reach <10% LEL for maintenance work with nitrogen only purging was almost 20 hours. Given the internals, a mist was chosen as method of delivery. Encapsulating mist in nitrogen and nitrogen only was sequenced through a high shear mixer and delivered to the tanks. The ratio of volumetric flowrates of carrier gas in tanks T1, T2 and T3 was 1:2, 2:1 and 2.2:1, respectively. The results show a 50-70% reduction in time (FIG. 2) to render each tank safe for entry compared to historical data. All vapor exhaust measurements were taken using an industrial scientific MX-6 LEL detector.

Comparative Example 2

A large, 250 $m^3$ 3-phase separator process vessel containing slop (heavy oil, BTEX, $H_2S$, sand, coke) needed to be emptied and cleaned for inspection and valve repairs during a turnaround. The vessel had tortuous internals, was laden with 2-3 feet of sludge and coke and continuously needed to remain above 200° F. to keep the sludge fluidized. The time taken to reach safe limits on the last turnaround was around 16 hours with nitrogen purging the method of choice. Two injection points were identified on the vessel given the vessels internals (specifically impingement baffles and splash baffles). The flow was split, and a sequence of encapsulating mist and nitrogen treatment was applied to the 3-phase separator vessel. Per Table-2, within 3.5 hours of sequencing encapsulating mist and nitrogen, the LELs including $H_2S$ was down to acceptable limits, an 80%-time savings for the customer. Additionally, LELs stayed suppressed (at close to 0%) for 7 days following treatment.

TABLE 1

Time savings in a 3-phase separator drum using novel treatment method

| Component | Initial Reading | Target | At 3.5 hrs of treatment |
|---|---|---|---|
| LEL % | 100% | 10% max | 0 |
| $H_2S$ | 8 ppm | 2 ppm max | 0 |
| $O_2$ | 17% | 2% | <2% |

Comparative Example 3

A 300-meter long diluted bitumen carrying piping conduit was selected to be cleaned for a valving change and an internal inspection. After the piping section was drained, the atmosphere was measured and read 100% LEL and 87 ppm $H_2S$. The operator preferred the use of an organic chemical with no surfactant. Previously, by using nitrogen purging only, the same conduit took 12 hours to bring down LELs to acceptable limits. By sequencing an organic encapsulating/absorbing agent with nitrogen, the equipment was rendered safe within 4 hours, a 65%-time savings to the user.

Example 4

Metal coupons were coated with 1 gram of Canadian bitumen and a comparative analyses of solvency strength was tested by spraying 10 ml of highly aromatic and natural solvents. Solvency strength was analyzed by quantification of the residues dislodged and from the coupon as a percentage of the total initial weight. Results are tabulated in Table 2. Additional tests were conducted to quantify the influence of elevated temperature Table 3, clearly indicating increased solubility of the organic residue at higher temperature. Although there were 14 solvents tested, any $C_5$-$C_{45}$ hydrocarbon may be used as the cleaning agent.

TABLE 2

Solubilization of Bitumen using organic solvents

| No. | Chemical | % Bit. Removed (ambient) |
|---|---|---|
| 1 | Friction reducing agent | <5 |
| 2 | Heavy reformate | 39.5 |
| 3 | Toluene/Xylene mix | 41 |
| 4 | Reformed Naphtha | 38 |
| 5 | Xylene | 73 |
| 6 | Toluene | 52 |
| 7 | Gas oil | <5 |
| 8 | Distillates (I) | 26.4 |
| 9 | Distillates (II) | <5 |
| 10 | Heavy aromatic naphtha | 5 |
| 11 | Terpene | 60 |
| 12 | Turpentine | 13 |
| 13 | Paint Thinner | 26.1 |
| 14 | Methyl Ester | −10.6 |

TABLE 3

| Effect of Temperature on solubility of cleaning chemistries | | | |
|---|---|---|---|
| No. | Chemical | % bitumen solubilized 90 F. | % bitumen solubilized 135 F. |
| 2 | Heavy reformate | 62.5 | 98.4 |
| 4 | Reformed Naphtha | 61.5 | 97.9 |
| 8 | Distillates (I) | 32 | 89.6 |
| 11 | Terpene | 74.2 | 96.8 |
| 7 | Gas Oil | 46.4 | 77.4 |
| 9 | Distillates (II) | 57.4 | 89.2 |

Although various embodiments have been shown and described, the present disclosure is not so limited and will be understood to include all such modifications and variations as would be apparent to one skilled in the art.

We claim:

1. A method for removing hydrocarbon contaminants and toxic gases from a system, comprising the steps of:

(i) providing a dry carrier gas source;

(ii) providing an encapsulating agent source;

(iii) providing a surfactant source;

(iv) mixing the encapsulating agent and the dry carrier gas in a high shear mixing device to create a liquid mist/foam which is introduced into the process system to cap generation of toxic gases from remaining organic residue;

(v) delivering dry carrier gas from the dry carrier gas source to the system to remove all liquid and gaseous hydrocarbon contaminants out of said process equipment (vi) sequencing or cycling of steps (iv) and (v) until concentration of explosive gases are reduced to a lower explosive limit of less than 10 percent.

2. A method for removing hydrocarbon contaminants and toxic gases from a process system, comprising the steps of:

(i) providing a dry carrier gas source;

(ii) providing a surfactant source;

(iii) providing a cleaning agent with a high solubility index from a cleaning agent source;

(iv) mixing the cleaning agent and the dry carrier gas in a high shear mixing device to create a liquid mist which is introduced into the process system so as to solubilize the heavy organic residues on metal surfaces;

(v) delivering dry carrier gas from the dry carrier gas source to the process equipment to remove all liquid and gaseous hydrocarbon contaminants out of said process equipment (vi) sequencing or cycling of steps (iv) and (v) until concentration of explosive gases are reduced to a lower explosive limit of less than 10 percent.

3. A method for removing hydrocarbon contaminants and toxic gases from a system, comprising the steps of:

(i) providing a dry carrier gas source;

(ii) providing an encapsulating agent source;

(iii) providing a cleaning agent with a high solubility index from a cleaning agent source;

(iv) mixing the cleaning agent and the dry carrier gas in a high shear mixing device to create a liquid mist/foam which is introduced into the system so as to solubilize kheavy organic residues on metal surfaces;

(v) mixing the encapsulating agent and the dry carrier gas in a high shear mixing device to create a liquid mist/foam which is introduced into the system to cap generation of toxic gases from remaining organic residue;

(vi) delivering dry carrier gas from the dry carrier gas source to the system to remove all liquid and gaseous hydrocarbon contaminants out of said system (viii) sequencing or cycling of at least two of the following steps (iv), (v) and (vi) until concentration of explosive gases are reduced to a lower explosive limit of less than 10 percent.

4. The method of claim 3, wherein the carrier gas is selected from the group consisting of carbon dioxide or a hydrocarbon gas selected from the group consisting of methane, fuel gas, natural gas, ethane, propane, butane and a combination thereof.

5. The method of claim 3, wherein the encapsulating agent comprises a foaming agent and a cleaning surfactant.

6. The method of claim 3, wherein the mixing device is an eductor.

7. The method of claim 3, wherein the mixing device nozzle is a t-fitting.

8. The method of claim 3, wherein the pressure differential across the mixing device is in the range of 60-150 psig.

9. The method of claim 3, wherein the expansion ratio across the mixing device has a foaming expansion ratio in the range of 200-1000.

10. The method of claim 3, where an $H_2S$ concentration is reduced to less than 2 ppm.

11. The method of claim 3, wherein the cleaning agent is selected from the group consisting of terpene, naphtha, distillates, xylene, toluene, turpentine, paint thinner, and methyl ester.

12. The method of claim 3, wherein the cleaning agent is injected into the process equipment at a temperature range of 60-250° F.

13. The method of claim 3, wherein the cleaning agent is d-limonene.

14. The method of claim 3, wherein the cleaning agent is an organic hydrocarbon compound with a carbon number in the range of $C_8$-$C_{40}$.

15. The method of claim 3, further comprising:

providing the carrier gas at a flow rate ranging from 10 scfm to 10,000 scfm, and wherein said carrier gas is nitrogen.

16. The method of claim 15, wherein the encapsulating agent further comprises an amine compound, a methyl ester and a foaming agent.

* * * * *